Patented Jan. 5, 1926.

1,568,323

UNITED STATES PATENT OFFICE.

CHARLES W. DEES, OF ELLENSBURG, WASHINGTON.

ENAMEL-CLEANING COMPOUND.

No Drawing.      Application filed November 27, 1923. Serial No. 677,320.

*To all whom it may concern:*

Be it known that I, CHARLES W. DEES, a citizen of the United States, residing at Ellensburg, county of Kittitas, and State of Washington, have invented a new and useful Enamel-Cleaning Compound; and I do hereby declare that the following is a full, clear, and exact specification, such as will enable others skilled in the art to which it appertains to make and use the same.

The invention is a mixture with which motor vehicles or the like may be readily and thoroughly cleaned.

The object of the invention is to provide an efficient cleaning compound which will also preserve the material.

Another object of the invention is to provide a simple and economical solution which will positively remove all dirt and grease from polished surfaces similar to those of motor vehicle bodies.

And a further object of the invention is to provide a solution containing simple and inexpensive ingredients which will not only thoroughly clean a polished surface but will also preserve the surface.

With these ends in view the invention embodies a solution made from acetic acid, ammonia with the concentration of about 28%, pulverized rotten stone, and water.

In preparing the solution I prefer to use the ingredients viz, five percent of acetic acid, twelve and one half percent of ammonia, twenty-five percent of pulverized rotten stone, and fifty-seven and one-half percent of water. After a thorough mixing the mixture is ready for use and may be applied to the surface with a soft cloth or the like or in any suitable manner.

It is understood that the proportions of any of the constituents may be varied as desired or either of them may be omitted and their qualities supplied by any other suitable ingredients.

It will be observed that a mixture containing these ingredients in the above proportions would readily and thoroughly remove dirt, grease, or any substance from a polished surface and thereby render a thoroughly clean surface.

Having thus fully described the invention, what I claim as new and desire to secure by Letters Patent, is:—

An enamel cleaning solution formed by mixing the following ingredients consisting of approximately five per cent of acetic acid, twelve and one half percent of ammonia, twenty-five percent of pulverized rotten stone and fifty-seven and one half percent of water.

CHARLES W. DEES.